United States Patent
Salkintzis

(10) Patent No.: US 10,652,798 B2
(45) Date of Patent: May 12, 2020

(54) METHOD AND DEVICE FOR ROUTING TRAFFIC OF APPLICATIONS INSTALLED ON A MOBILE DEVICE

(71) Applicant: MOTOROLA MOBILITY LLC, Chicago, IL (US)

(72) Inventor: Apostolis K. Salkintzis, Athens (GR)

(73) Assignee: MOTOROLA MOBILITY LLC, Chicago, IL (US)

(*) Notice: Subject to any disclaimer, the term of this patent is extended or adjusted under 35 U.S.C. 154(b) by 390 days.

(21) Appl. No.: 14/600,093

(22) Filed: Jan. 20, 2015

(65) Prior Publication Data

US 2016/0142963 A1    May 19, 2016

Related U.S. Application Data

(60) Provisional application No. 62/080,232, filed on Nov. 14, 2014.

(51) Int. Cl.

| | |
|---|---|
| *H04W 40/02* | (2009.01) |
| *H04W 48/14* | (2009.01) |
| *H04W 28/12* | (2009.01) |
| *H04L 12/725* | (2013.01) |
| *H04W 48/16* | (2009.01) |
| *H04W 48/18* | (2009.01) |

(52) U.S. Cl.
CPC ........... *H04W 40/02* (2013.01); *H04L 45/306* (2013.01); *H04L 45/308* (2013.01); *H04W 28/12* (2013.01); *H04W 48/14* (2013.01); *H04W 48/16* (2013.01)

(58) Field of Classification Search
CPC ..... H04W 40/02; H04W 28/12; H04W 48/14; H04W 48/16; H04L 45/308; H04L 45/306
See application file for complete search history.

(56) References Cited

U.S. PATENT DOCUMENTS 8,185,152 B1 * 5/2012 Goldner ............... H04W 48/18
                                                      370/282
9,483,627 B1 * 11/2016 Ferg .................. G06F 21/31
(Continued)

FOREIGN PATENT DOCUMENTS

| EP | 2023685 A1 | 2/2009 |
| WO | 2014175967 A1 | 10/2014 |

OTHER PUBLICATIONS

3GPP TS 23.402 V8.0.0 (207-12), 3rd Generation Partnership Project; Technical Specification Group Services and System.
(Continued)

*Primary Examiner* — Ajit Patel
*Assistant Examiner* — Wilfred Thomas

(57) ABSTRACT

A mobile device performs method for routing traffic of applications installed on the mobile device. The method includes receiving, from a source external to the mobile device, a set of attributes for a first application installed on the mobile device. The method further includes receiving, from a network element, a set of application traffic routing rules. Additionally, the method includes selecting, under the control of at least one application traffic routing rule of the received set of application traffic routing rules, a network access from multiple network accesses of the mobile device for routing traffic of the first application. The selecting is based on the set of attributes for the first application.

19 Claims, 4 Drawing Sheets

(56) References Cited

U.S. PATENT DOCUMENTS

| | | | | |
|---|---|---|---|---|
| 2010/0048205 A1* | 2/2010 | Guilford | ............... | H04W 28/08 |
| | | | | 455/432.1 |
| 2012/0041672 A1* | 2/2012 | Curtis | ................... | H04W 4/029 |
| | | | | 701/426 |
| 2012/0204131 A1* | 8/2012 | Hoang | .................... | G06F 9/445 |
| | | | | 715/835 |
| 2012/0208502 A1 | 8/2012 | Perras | | |
| 2013/0198830 A1 | 8/2013 | Nemoto et al. | | |
| 2013/0286836 A1 | 10/2013 | Uzelac et al. | | |
| 2013/0290319 A1* | 10/2013 | Glover | ................ | G06F 17/3053 |
| | | | | 707/723 |
| 2014/0023059 A1 | 1/2014 | Gupta | | |
| 2014/0040504 A1* | 2/2014 | Gupta | .................... | H04W 4/70 |
| | | | | 709/244 |
| 2014/0086177 A1* | 3/2014 | Adjakple | .............. | H04W 12/08 |
| | | | | 370/329 |
| 2014/0089523 A1 | 3/2014 | Roy et al. | | |

OTHER PUBLICATIONS

International Search Report for WO Application PCT/US2015/056181 dated Feb. 22, 2016.
International Preliminary Report on Patentability for WO Application PCT/US2015/056181 dated May 16, 2017.

* cited by examiner

– 1 –

METHOD AND DEVICE FOR ROUTING TRAFFIC OF APPLICATIONS INSTALLED ON A MOBILE DEVICE

RELATED APPLICATIONS

The present application is related to and claims benefit under 35 U.S.C. § 119(e) from U.S. Provisional Patent Application Ser. No. 62/080,232, filed Nov. 14, 2014, titled "Method and Device for Routing Traffic of Applications Installed on a Mobile Device", the entire contents of which are incorporated herein by reference.

FIELD OF THE DISCLOSURE

The present disclosure relates generally to wireless communications and more particularly to a method and device for routing traffic of applications installed on a mobile device.

BACKGROUND

As it becomes more and more common for wireless communication devices to implement multiple wireless access technologies, wireless network operators are beginning to deploy different wireless access networks (also referred to in the art as radio access networks (RANs) and also referred to herein simply as access networks) that share a same core network. For example, some operators of networks that implement and/or are compliant with one or more $3^{rd}$ Generation Partnership Project (3GPP) standards or specifications, such as Long Term Evolution (LTE) networks, are planning to integrate WiFi networks into their existing cellular network infrastructure. Such WiFi networks are termed in the standards as "trusted" WiFi networks.

To take advantage of the expansion in available wireless access network coverage, wireless communications devices are increasingly being designed with the capability of maintaining multiple active network access interfaces over one or more available wireless access networks. Accordingly, the wireless communication devices should also be capable of handling routing policy or preferences, e.g., of the network operator and/or users of the device, for the multiple active network access interfaces. For example, many wireless communication devices have installed thereon multiple applications that communicate data traffic. Thus, it is desirable that the wireless communication devices are capable of handling routing policy that assists in routing the data traffic of its installed applications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
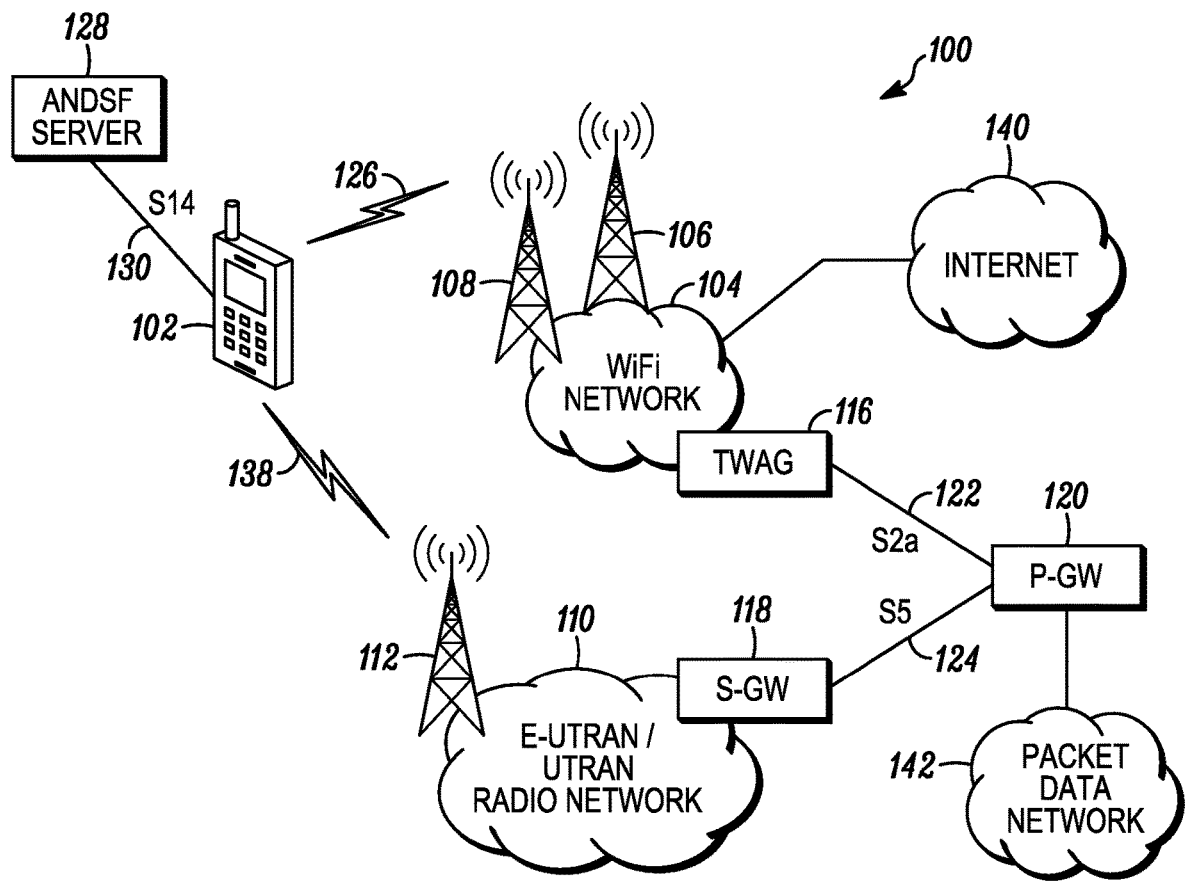
FIG. 1 is a schematic diagram illustrating a wireless communication environment in which at least one wireless communication device is configurable in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, are methods and a wireless communication device, also referred to herein as a mobile device, configured for routing traffic of applications installed on the mobile device. In accordance with one particular embodiment is a method for routing traffic of applications installed on the mobile device, which includes receiving, from a source external to the mobile device, a set of attributes for a first application installed on the mobile device. An attribute is defines as a general or non-unique parameter, label, characteristic, aspect, or element of or associated with an application as opposed to an identity or identifier that is unique to the application. Examples of application attributes, or simply attributes, include category type, cost, developer name, etc. The method further includes receiving, from a network element, a set of application traffic routing rules. Additionally, the method includes selecting, under the control of at least one application traffic routing rule of the received set of application traffic routing rules, a network access from multiple network accesses of the mobile device for routing traffic of the first application. The selecting is based on the set of attributes for the first application.

In accordance with another embodiment is a mobile device configured for routing traffic of applications installed on the mobile device. The mobile device includes at least a processing element, also referred to herein as a processor. The processor is configured to receive a set of attributes for a first application installed on the mobile device and receive, from a network element, a set of application traffic routing rules. The processor is also configured to apply a first application traffic routing rule of the received set of application traffic routing rules to select, based on a first attribute of the set of attributes for the first application, a first network access from multiple network accesses of the mobile device for routing traffic of the first application.

In accordance with yet another embodiment is a method for routing traffic of applications installed on the mobile device. This method includes determining a set of attributes for a first application installed on the mobile device. The method also includes receiving, from a network element, a first application traffic routing rule that defines how application traffic that correlates with user preferences should be routed. The method further includes determining a user preference, and correlating, to the user preference, a first attribute of the set of attributes for the first application.

Additionally, the method includes applying the first application traffic routing rule, responsive to correlating the first attribute to the user preference, to select a first network access from multiple network accesses of the mobile device for routing traffic of the first application.

In accordance with at least some of the various embodiments of the present teachings, a mobile device can route traffic of one or more applications installed on the mobile device over multiple active network access interfaces (also interchangeably referred to herein as network accesses, data interfaces, and virtual private network (VPN) interfaces) with more flexibility than possible with conventional routing mechanisms. For example, the present teachings regarding application traffic routing can easily accommodate updates to routing policy provisioned in the mobile device by a network operator through a network device. Moreover, the present teachings regarding application traffic routing can also accommodate changes to the active network access interfaces and changes to access networks that are available to the mobile device.

FIG. 1 illustrates a schematic diagram of an example environment 100 within which may be implemented methods and devices for routing traffic of applications installed on a mobile device, in accordance with the present teachings. In this particular embodiment, a wireless communication device 102, which in this example is a mobile or portable device, is configured for establishing wireless links to infrastructure equipment within multiple access networks, e.g., an access network 104 and an access network 110, to, for instance, exchange data and voice communications with other mobile or portable devices or with other devices such as printers and servers. At any given point in time, the access networks that are in range of a wireless communication device and with which the wireless communication device is configured to establish wireless links are termed herein as available access networks to the wireless communication device. The two access networks 104 and 110 can use any type of access technology for a wireless communication device to access and communicate using the access network; but in one embodiment, two different access technologies are used to, respectively, communicate over the two access networks 104 and 110. Access technologies are also referred to herein as wireless access technologies and also known in the art as radio access technologies (RATs).

In this illustrative embodiment, the access network 104 is a Wireless Local Area Network (WLAN) having at least one access point, e.g., 106, 108, for facilitating wireless links, e.g., 126, using Institute of Electrical and Electronics Engineers (IEEE) 802.11 standards, also referred to in the art as WiFi technology. Thus, access network 104 is also referred to herein as a WiFi network or a WiFi access network. However, any other type of wireless access technology such as Worldwide Interoperability for Microwave Access (WiMax) or a cellular or cellular-based access technology may be implemented in the access network 104. Additionally, the mobile device 102 can connect to the Internet 140 using the WLAN network 104.

The access network 110 is a cellular access network, also referred to herein as a cellular network, having at least one cellular tower or base station, e.g., 112, for facilitating wireless links, e.g., 138, to the access network 110. As shown, the cellular network 110 and a core network that supports communications using the cellular network 110 are implemented using 3GPP standards also referred to herein as 3GPP specifications, for example as an LTE network. More particularly, the cellular network 110 is an Evolved UMTS Terrestrial Radio Access Network (E-UTRAN) or a legacy UTRAN having at least one eNodeB or NodeB, e.g., 112, for facilitating wireless links to user equipment (UE) such as the wireless communication device 102.

In an embodiment, the cellular access network 110 uses E-UTRA as the RAT. However, any other cellular or cellular-based access technology can be used including, but not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Universal Mobile Telecommunication System (UMTS), Wideband CDMA (WCDMA), IEEE 802.16, etc., or variants thereof.

The core network that supports and interconnects the WiFi network 104 and the cellular network 110 is, in this embodiment, a System Architecture Evolution (SAE) core, also referred to in the art as an Evolved Packet Core (EPC). The EPC subcomponents can include, among other subcomponents, a Mobility Management Entity (MME) not shown, a Serving Gateway (S-GW) 118, a PDN Gateway (P-GW) 120, a Home Subscriber Server (HSS) not shown, an Access Network Discovery and Selection Function (ANDSF) server 128, and an Evolved Packet Data Gateway (ePDG) not shown.

For an embodiment, the ANDSF server 128 interfaces or connects to the mobile device 102 using a S14 interface 130 that enables IP level communications between the ANDSF server 128 and an ANDSF client (not shown) in the mobile device 102. The cellular network 110 can interface to the EPC using an S5 interface 124 between the P-GW 120 and the S-GW 118. In the present embodiment, the WiFi network 104 is implemented as a trusted WiFi network and, therefore, includes a Trusted WiFi Access Gateway (TWAG) 116. The WiFi network 104 can, thus, interface to the EPC using an S2a interface 122 between the P-GW 120 and the TWAG 116. The 3GPP interfaces, also referred to in the 3GPP specifications as reference points, and the 3GPP EPC subcomponents and other 3GPP network devices or elements are well known and are specified in various 3GPP specifications. Therefore, details of their functionality, operation, construct, and/or implementation are omitted herein for the sake of brevity.

As shown, the wireless communication device 102 maintains two physical wireless links used to support one or more active communication sessions in order to communicate data such as video and/or voice. More particularly, the wireless communication device 102 has a wireless link 126 to the access point 108 in the WiFi network 104 to communicate data using the WiFi network 104; and the wireless communication device 102 has a wireless link 138 to the base station 112 in the cellular network 110 to communicate data using the WiFi network 110.

In an embodiment, the link 126 supports a direct WLAN connection, which refers to a layer 3 or network layer connection that corresponds to and is implemented using a network access or data interface (for instance an Internet Protocol (IP) interface having associated therewith an IP address). The direct WLAN connection is used to route IP traffic between the mobile device 102 and the Internet 140 though the WiFi network 104. This traffic is termed as non-seamless WLAN offload traffic. The link 126 may also support a packet data network (PDN) connection that corresponds to and is implemented using a separate data interface for access point name (APN) routing through the WiFi network 104.

More particularly, the mobile device 102 can have multiple active network access or data interfaces using the single physical WiFi link 126: one direct interface such as a Direct WLAN interface corresponding to a Direct WLAN connection; and zero or more virtual private network (VPN) interfaces such as a WLAN PDN interface corresponding to a WLAN PDN connection. The direct interface is created when the mobile device 102 connects to and establishes the physical link 126 using the access point 108. A VPN interface (WLAN PDN) can be created later to establish a logical connection between the mobile device 102 and a Packet Data Network 142 connected to a P-GW, e.g., 120 of FIG. 1, in the core network (EPC). A PDN can be, for example, an enterprise network, an IP Multimedia Subsystem (IMS), the Internet, etc. Also, as used herein, a link refers to a physical connection. A network connection refers to a logical connection (that may be represented by an APN, security methods, an IP address, etc.) used by the mobile device 102 to route data packets using a particular network (which may include a particular PDN) using a given physical link. A data interface, network access interface, network access, and VPN interface refers to a logical construct that the mobile device uses which corresponds to and facilitates routing using a given network connection.

All packets that go to the direct interface (Direct WLAN) are delivered to the WLAN 104, which then routes them forward. On the contrary, all packets that go to a VPN interface (WLAN PDN) are forwarded to a P-GW in the EPC, which then forwards them to an external PDN. In other words: packets sent to the direct interface do not traverse the EPC (are offloaded directly to the WLAN 104); and packets sent to a WLAN PDN interface go to the EPC. Note that traffic sent to the direct interface is interrupted when WiFi is lost (cannot be handed over to the EPC), hence this traffic is called "non-seamless WLAN offload" traffic. However, traffic sent to a WLAN PDN interface can be seamlessly handed over to UTRAN/E-UTRAN when the WiFi is lost, hence this traffic is called "seamless WLAN offload" traffic. In accordance with the teachings herein, methods can be performed by the wireless communication device 102 for routing traffic of applications installed on the mobile device over a plurality of active network access interfaces, for example over multiple active network access interfaces corresponding to the wireless links 126 and 138.

Figure 2:
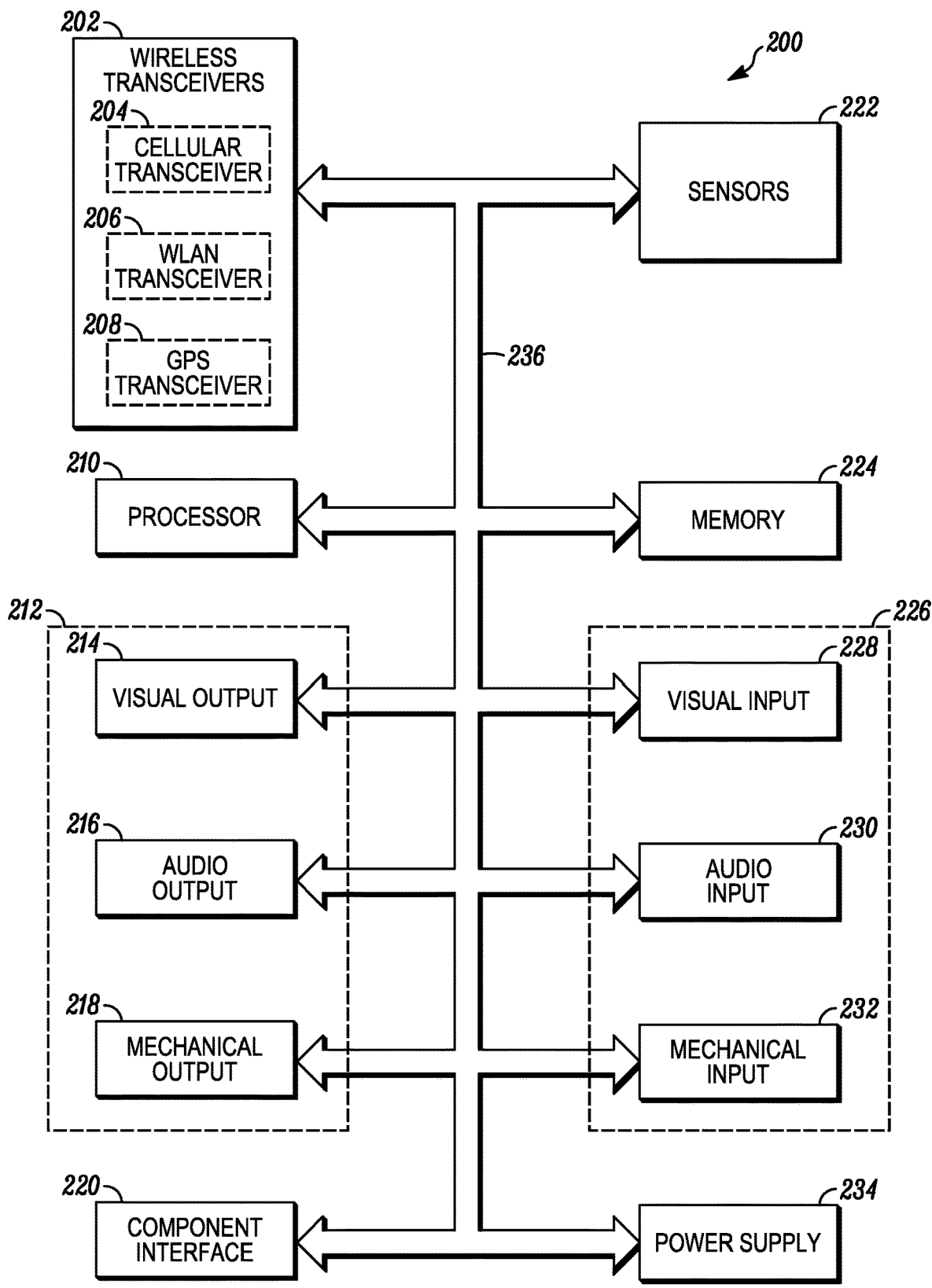
FIG. 2 is a block diagram illustrating internal hardware components of a wireless communication device configured in accordance with some embodiments.

FIG. 2 shows a block diagram illustrating example internal hardware components 200 of the wireless communication device 102 of FIG. 1, in accordance with an embodiment. The wireless communication device 102 is intended to be representative of a variety of mobile devices or UE including, for example, cellular telephones, personal digital assistants (PDAs), smart phones, laptop computers, tablets, phablets, or other handheld or portable electronic devices. As shown in FIG. 2, the internal hardware elements or components 200 include one or more transceivers 202, one or more processors 210, output components 212, a component interface 220, one or more sensors 222, a memory component 224, input components 226, and a power supply 234. As further illustrated, the internal components 200 are coupled to one another, and in communication with one another, by way of one or more internal communication links 236, for instance an internal bus. A limited number of device components 202, 210, 212, 220, 222, 224, 226, and 234 are shown at 200 for ease of illustration, but other embodiments may include a lesser or greater number of such components in a device, such as device 102. Moreover, other elements needed for a commercial embodiment of a device that incorporates the components shown at 200 are omitted from FIG. 2 for clarity in describing the enclosed embodiments.

We now turn to a brief description of the components within the schematic diagram 200. In general, the processor 210 and memory 224 may be configured with functionality in accordance with embodiments of the present disclosure as described in detail below with respect to the remaining FIGS. 3-4. "Adapted," "operative," "capable" or "configured," as used herein, means that the indicated components are implemented using one or more hardware elements, which may or may not be programmed with software and/or firmware as the means for the indicated components to implement their desired functionality. Such functionality is supported by the other hardware shown in FIG. 2, including the device components 202, 212, 220, 222, 226, and/or 234.

Continuing with the brief description of the device components shown at 200, as included within the device 102, the wireless transceivers 202 include a cellular transceiver 204, a WLAN transceiver 206, and a Global Positioning System (GPS) transceiver 208. More particularly, the cellular transceiver 204 is configured to implement any suitable cellular or cellular-based technology to conduct cellular communications of data over a cellular network, such as the cellular network 110. The WLAN transceiver 206 is a WiFi transceiver 206 configured to conduct WiFi communications over a WiFi network, such as the WiFi network 104, in accordance with the IEEE 802.11 (a,b, g, n or ac) standard.

The processor 210 includes arithmetic logic and registers necessary to perform the digital processing required by the device 102 to, for example, route traffic of applications installed on the mobile device in a manner consistent with the embodiments described herein. For one embodiment, the processor(s) 210 represent a primary microprocessor or central processing unit (CPU) of the device 102 such as an application processor of a smartphone 102. In another embodiment, the processor(s) 210 represent a baseband processor or other ancillary or standalone processor to the CPU that is used by one or more of the wireless transceivers 202 to provide the processing capability, in whole or in part, needed for the device 102 to perform its intended functionality including wireless transmissions to facilitate the device's operation in accordance with the present teachings, for instance by reference to the flow diagrams shown in FIGS. 3-4. Depending at least in part on the particular function being performed and a given device 102 design, various functionality or protocols may be executed by the processor 210 in hardware or as software or firmware code.

In the embodiment shown, the output components 212 include: one or more visual output components 214 such as a liquid crystal display and/or light emitting diode indicator; one or more audio output components 216 such as a speaker, alarm, and/or buzzer; and one or more mechanical output components 218 such as a vibrating mechanism. Similarly, the input components 226 include one or more visual input components 228 such as a camera lens and photosensor; one or more acoustic receiver or audio input components 230 such as one or more transducers (e.g., microphones), including for example a microphone array and beamformer arrangement or a microphone of a Bluetooth headset; and one or more mechanical input components 232 such as a touchscreen display, a flip sensor, keyboard, keypad selection button, and/or switch.

As mentioned above, this embodiment of internal components 200 also includes one or more of various types of sensors 222 as well as a sensor hub to manage one or more functions of the sensors. The sensors 222 include, for example, proximity sensors (e.g., a light detecting sensor, an ultrasound transceiver or an infrared transceiver), touch sensors, altitude sensors, an accelerometer, a tilt sensor, and a gyroscope, to name a few.

The memory component 224 represents one or more memory elements of any of a variety of forms, for example read-only memory, random access memory, static random access memory, dynamic random access memory, etc. In an embodiment, the processor 210 uses the memory component 224 to store and retrieve data. In some embodiments, the memory component 224 is integrated with the processor 210 into a single component such as on an integrated circuit. However, such a single component still usually has distinct portions/sections that perform the different processing and memory functions.

The data that is stored by the memory component 224 includes, but need not be limited to, operating systems, programs (e.g., applications, protocols, and other code), and informational data. Each operating system includes executable code that controls basic functions of the wireless communication device 102, such as interaction among the various components included among the internal components 200, communication with external devices via the wireless transceivers 202 and/or the component interface 220, and storage and retrieval of programs and data, to and from the memory component 224. As for programs, such as one or more applications installed on the mobile device 102, each program includes executable code that utilizes an operating system to provide more specific functionality, such as file system service and handling of protected and unprotected data stored in the memory component 224. Such programs include, among other things, programming for communicating (e.g., sending and/or receiving) various data such as voice and/or video and for enabling the wireless communication device 102 to perform methods or processes such as described below by reference to FIGS. 3-4. Finally, with respect to informational data, this is non-executable code or information such as routing policy data, user reference data, or application attribute data that an operating system or program references and/or manipulates, in one embodiment, for performing functions of the wireless communication device 102.

In an embodiment, the component interface 220 provides a direct physical connection to auxiliary components such as a docking station or printer or accessories for additional or enhanced functionality. For example, the component interface 220 can be implemented as one or more Universal Serial Bus (USB) ports, RS-232 or other serial connectors, etc. The power supply 234, such as a battery, provides power to the other internal components 200 while enabling the wireless communication device 102 to be portable.

Figure 3:
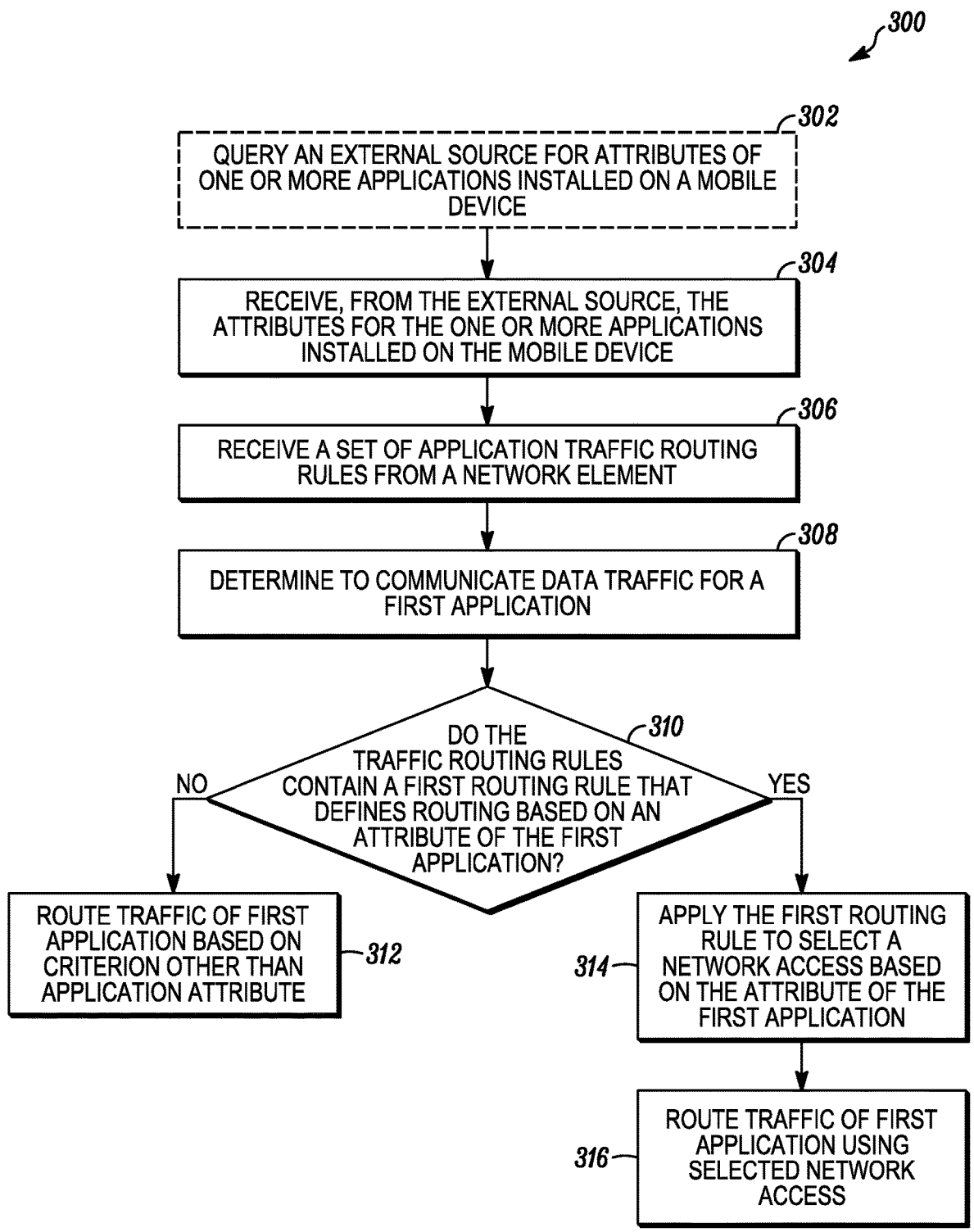
FIG. 3 is a flowchart illustrating a method for routing traffic of applications installed on a wireless communication device in accordance with an embodiment.
Figure 4:
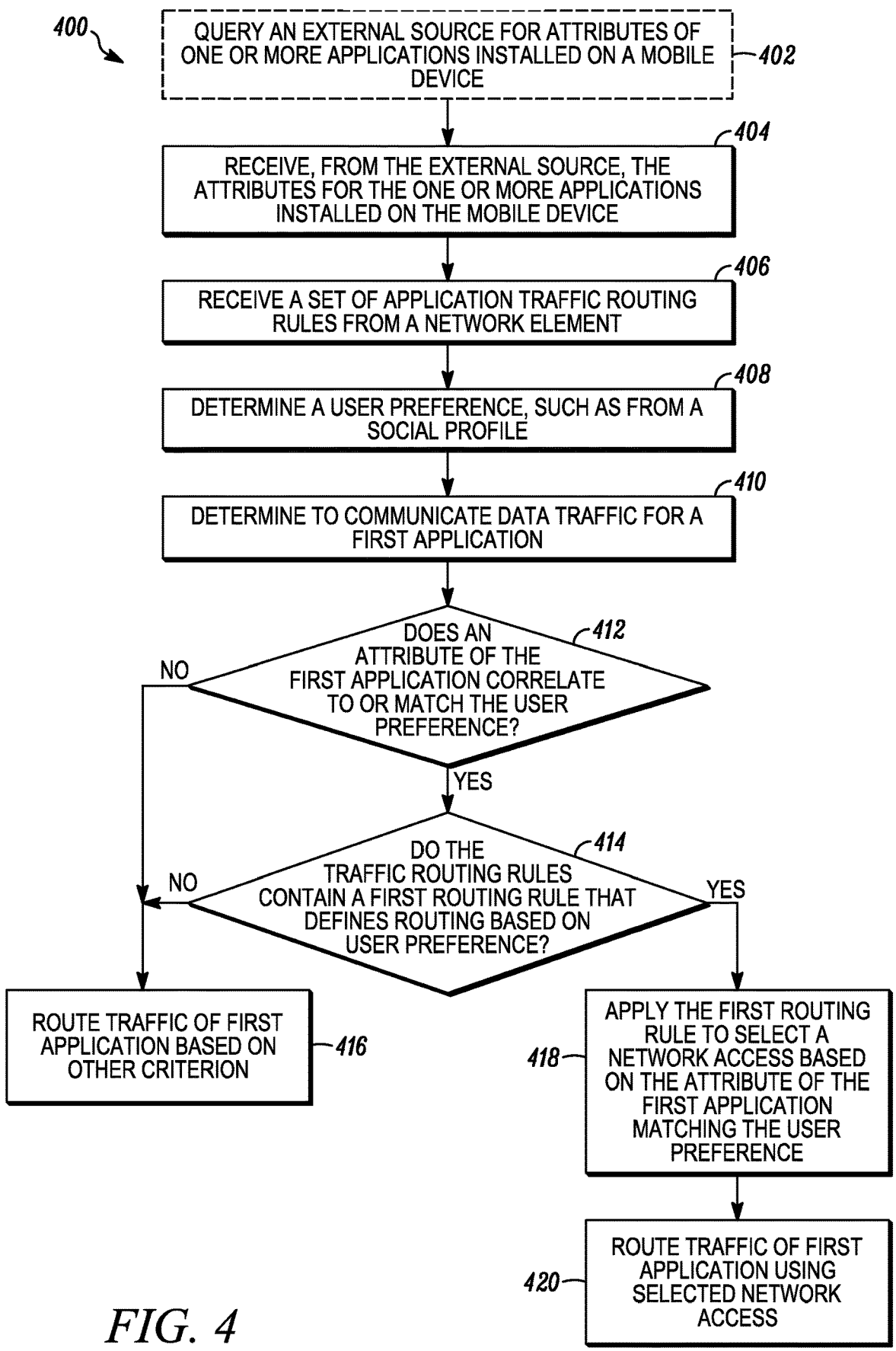
FIG. 4 is a flowchart illustrating a method for routing traffic of applications installed on a wireless communication device in accordance with another embodiment.

Although not shown, the mobile device 102 implements a protocol stack or protocol suite having multiple "layers" that each have, include, contain, or implement one or more protocols, procedures, and/or algorithms that enable various functionality of the wireless communication device 102 in accordance with the present disclosure illustrated, for instance, by reference to FIGS. 3-4. In one embodiment, the protocol stack is executed by one or more processors 210 using protocols, procedures, algorithms, and informational data (such as provisioned routing policy, also referred to herein as application traffic routing or steering rules, user reference data, and application attributes), stored in the memory component 224.

In one implementation, the protocol stack includes three layers or sections: an application layer; an Operating System (OS) framework layer; and a routing layer. The protocol stack can include other layers, for instance other layers corresponding to an Open System Interconnection (OSI) model of networking or corresponding to an Internet Protocol suite. Such layers include, for example, a physical layer, a data link or link layer, a transport layer, a session layer, or a presentation layer.

The application layer contains various applications installed on the mobile device including, but not limited to, a Skype application (app), a YouTube application, an IMS-based application (also referred to herein as an IMS client) that supports voice or video over IP, file sharing, etc., and one or more other applications, e.g. a Multimedia Messaging Service (MMS) application. In one example, the applications are obtained or downloaded from an application store. For instance, the application store is implemented using a server and represented as an icon displayed on the mobile device 102, which facilitates access by a user to the applications stored on the server.

During operation of the mobile device 102, the applications can initiate the establishment of an active communication session, for instance a voice call by the Skype application and a video session by the IMS client. An active communication session occurs between specific points in time when the session is established and torn down using the requisite signaling to enable ongoing communication of traffic between two endpoints. The traffic can be in the form of data chunks referred to herein generally as packets. During an active communication session, an application generates outgoing traffic or packets that are provided to and/or forwarded using one of a plurality of network accesses. More particularly, the mobile device 102 may select one of multiple active network access interfaces in accordance with the present teachings for routing the packets to an endpoint over the access network associated with and/or identified by the selected access network access interface.

The OS framework layer implements a set of functions that support the communication between the application layer and, at least, a transport layer. The OS framework layer enables the applications to utilize the transport services provided by the transport layer and also to utilize other services provided by other layers. Such services may include location services, media rendering services, content encoding, presentation services, etc. The OS framework layer can include an ANDSF client having functionality for communicating with an ANDSF server, such as the ANDSF server 128 shown in environment 100 of FIG. 1, in accordance with the 3GPP specifications, e.g., Technical Specification (TS) 24.312 and TS 23.402 clause 4.8 to facilitate the present teachings. Alternatively, the application layer includes the ANDSF client as a mobile application. The routing layer, also referred to as a network layer of the OSI model, enables packets to be effectively routed through a set of, meaning one or more, access networks.

We turn now to a detailed description of the functionality of the device 102 of FIG. 1 and device components 200 of FIG. 2 implementing protocols, procedures, and/or algorithms in accordance with the teachings herein illustrated by reference to FIGS. 3 and 4. FIGS. 3 and 4 show logical flow diagrams illustrating general methods 300 and 400, respectively, performed by a device, such as the device 102, for routing traffic of applications installed on the mobile device in accordance with the present teachings. In a particular implementation, at least some portions of the methods 300 and 400 are performed using at least one processor 210 and the memory 224 of the device 102.

Turning now to the details of method 300, where the mobile device 102 does not automatically receive one or more attributes for the applications when they are installed, the mobile device 102 can query 302 an external source for attributes of the one or more applications installed thereon. In one example, the mobile device 102 queries for the attributes of all of the applications installed thereon. In another example, the mobile device 102 queries for a subset of all the applications installed thereon. In any event, the mobile device 102 receives 304 a set of attributes for all or a subset of applications installed on the mobile device 102. This may include receiving a set of one or more attributes for the Skype application (also referred to herein as the first application), the IMS-based application, the YouTube application, and any other applications installed on the mobile device 102. Alternative to querying the external source, the mobile device 102 receives the application attributes within the content of the downloaded application.

For an embodiment, receiving 304 the set of attributes for the one or more applications includes querying 302 an application store from which the applications were received to receive the set of attributes. For example, the mobile device 102 can use an application programming interface (API) to retrieve or obtain the application attributes. One illustrative API use is implemented through the mobile device 102 issuing to a uniform resource identifier (URI) a GET request as defined in the Hypertext Transfer Protocol (HTTP), for example as described in Request for Comments (RFC) 2616. For the first (Skype) application, for instance, the mobile device 102 can issue a direct GET request to a URI of an application store as follows: https://play.google.com/store/apps/details?id=com.skype.raider. For another embodiment, receiving the set of attributes for the first application comprises querying a developer's server of the first application to receive the set of attributes. For the Skype application example, the mobile device 102 can issue a GET request to a URI of a server of the developer as follows: https://androidquery.appspot.com/api/market?app=com.skype.raider.

The application attributes can be any type of information that corresponds or relates to or describes or categorizes multiple applications, as opposed to an application identifier or identity that is unique to a single application. Example attributes include, but are not limited to, category type, developer name or identity, rating, cost, version number, etc. In an embodiment, a category type is a label used by an application store to group or categorize multiple applications; and an application store may have tens of such category types. Stated another way, a category type is used, by an application store from which the application was obtained, to categorize an application among a plurality of applications. Example category types include, but are not limited to, business, comics, games, finance, medical, music & audio, media & video, family, sports, social, etc. The rating identifies how one or more users evaluated the application, for example the number of stars given to the application. The cost can identify an actual cost or simply indicate whether the user paid for the application or if it was free.

Method 300 continues with the mobile device 102 receiving 306 a set of one or more application traffic routing rules, also referred to as steering rules and routing policy, from a network element. Application traffic routing rules, as used herein, includes one or more rules that identify network operator (operator) preferences of access networks to route certain application traffic. In one embodiment, the application traffic routing rules are provisioned in the mobile device 102 using an interface to a network element within a core network that supports the set of access networks available to the mobile device. For instance, the set of application traffic routing rules is received from a 3GPP-compliant network element. More specifically, the processor 210 can be configured to connect to an Access Network Discovery and Selection Function (ANDSF) server of a 3GPP-compliant network to receive the set of application traffic routing rules.

For a particular example, an ANDSF client within the OS framework layer or within the application layer of the mobile device 102 can be provisioned with network or operator routing policy over the S14 interface 130 to the Access Network Discovery and Selection Function server 128 of the Evolved Packet Core of a $3^{rd}$ Generation Partnership Project compliant network. In accordance with the 3GPP specifications, the ANDSF client can be provisioned by the ANDSF server 128 with ANDSF policies including Inter-APN Routing Policy (IARP) and/or Inter-System Routing Policy (ISRP). Accordingly, application traffic routing rules can be included in 3GPP-compliant ISRP or IARP received from a network element. The IARP contains interface selection policies for selecting an IP interface to route packets among a choice of available IP interfaces in both 3GPP and non-3GPP access networks. The ISRP contains interface selection rules (similar to IARP) for traffic distribution for different types of traffic flows from different types of applications over different access networks for mobile devices that are configured for various features as defined in the 3GPP specifications. All these policies can be valid in any location and time or can be valid in a given location and/or for a given time.

At block 308, the mobile device 102 determines to communicate data traffic for a first application, such as the Skype application, and the mobile device determines 310 whether the received and provisioned application traffic routing rules contains a first routing rule that defines routing based on an attribute of the Skype application. If the mobile device 102 is provisioned with such a rule, it applies 314 this rule to select a network access based on the attribute of the Skype application and routes 316 the Skype traffic using the selected network access. In this case, receiving the set of application traffic routing rules includes receiving a first application traffic routing rule that defines how application traffic should be routed based on a first attribute of the set of attributes of the Skype application; and the network access is selected under the control of this first application traffic routing rule. Otherwise, the mobile device 102 routes 312 the Skype traffic based on a criterion other than application attribute, such as based on a default routing or some sort of stored routing table.

For one example implementation, the home operator for the mobile device 102, e.g., AT&T, provisions the ANDSF server 128 with policy containing application traffic routing rules that state that: all traffic of applications developed by AT&T Services, Inc. is to be routed through the cellular network 110; and all applications having an attribute of the category type media & video, such as Skype or YouTube is to be routed over the WiFi network 104. The mobile device 102 receives 306 and stores this routing policy and associated routing rules. Accordingly, when the mobile device 102 determines 308 to communicate data traffic of the Skype application, the mobile device determines 310 that a traffic routing rule defines routing based on an attribute of the Skype application, in this case, the category type media & video. Upon applying 314 this rule, the mobile device 102 selects the network access corresponding to the WiFi network 104, and routes 316 the Skype traffic using the selected network access.

The method 400 includes blocks 402, 404, and 406, which represent the same or similar functionality as is correspondingly described above with respect to blocks 302, 304, and 306. For the sake of brevity, the description is not repeated here. However, method 400 uses the routing rules to route application traffic based on a different criterion, namely user preference. In general, the mobile device 102 determines a user preference and determines whether at least one attribute of the set of attributes of at least one application correlates to or matches the user preference. Thereby, selecting the network access is based on whether the at least one attribute correlates to or matches the user preference. More specifically, the processor 210 can be configured to: determine a user preference; determine that the first attribute correlates to the user preference; and apply the first application traffic routing rule to select the first network access based on the first attribute correlating to the user preference. For a particular embodiment, the first attribute is a category type. Thus, a category type of the first set of attributes of the first application can be used in determining whether the at least one attribute correlates to the user preference.

Accordingly, method 400 continues with the mobile device 102 determining 408 a user preference, which is used as explained by reference to the remainder of method 400, to select a network access to route application traffic. The mobile device 102 can determine user preference in a number of ways. For example, the mobile device 102 can retrieve user preferences that were manually entered into the device by the user. In another example, the mobile device 102 uses any suitable algorithm to automatically determine user preferences based on information that the mobile device 102 can automatically obtain, such as information from stored user profiles or other information that the user has provided to one or more other applications.

For one embodiment, the mobile device 102 determines one or more user preferences from information in a user's social profile. In one particular example, the mobile device 102 accesses user information on a social website or through an installed application used to access the social website. For instance, where the social profile and/or other information on the social application indicates that the user is a doctor, the mobile device 102 might determine that the user prefers applications that are of category type medical. Where the social profile and/or other information on the social application indicates that the user is a teenaged boy who plays football and likes music, online gaming, and watching and uploading videos to and from the YouTube application, the mobile device 102 might determine that the user prefers applications that are of category types sports, games, media & video, and music & audio. In these examples, it can be said that the determined user preferences are application category preferences that are determined from information in a user social profile.

At block 410, the mobile device 102 determines to communicate traffic for a first application, in this example the YouTube application. The method 400 continues with the mobile device 102 determining 412 whether an attribute of the YouTube application correlates to or matches a user preference. In a particular implementation example, the user is the teenaged boy whose application category preferences were determined to include the category types sports, games, media & video, and music & audio. The mobile device 102 determines 412 that an attribute of the YouTube application, namely its category type media & video, correlates to and in this case matches the user preference of applications with a category type media & video. Thus, in this example, correlating the user preference to the first attribute of the first application includes correlating an application category preference to a category type of the application. The method 400, therefore proceeds toward block 414. Where the mobile device 102 alternatively determines 414 that no attribute of the application correlates to or matches a user preference, the method 400 proceeds toward block 416, where the mobile device 102 routes 416 the YouTube application traffic based on some other criterion, such as based on a default routing or some sort of stored routing table.

At block 414, the mobile device 102 determines whether the received and provisioned traffic routing rules contain a routing rule that defines routing based on user preference. For one implementation example, the mobile device 102 does receive 406 a set of application traffic routing rules that define how application traffic that correlates with user preferences should be routed. For instance, a received steering rule directs the mobile device 102 to route all traffic through the cellular network 110 of applications having an attribute that matches one or more of the user's preferences. Accordingly, the mobile device 102 applies 418 this rule to select a network access based on the category type attribute of the YouTube application matching the user's application category preference. Namely, the mobile device 102 applies the steering rule and selects the network access corresponding to the cellular network 100 and routes 420 the YouTube traffic using the selected network access. Otherwise, the mobile device 102 routes 416 the YouTube traffic based on some other criterion.

In accordance with the present teachings, a mobile device can be provisioned with routing rules that indicate preferred routing for certain application traffic. One or more routing rules can indicate, for example: the preferred wireless access for media & video apps, e.g., WLAN; the preferred wireless access for apps developed by the home operator; the preferred wireless access for apps that match the user's profile; access criteria for routing media & video apps to WLAN, e.g. when WAN bandwidth>2 Mbps; access criteria for routing music & audio apps to WLAN, etc.

The mobile device can adapt its routing behavior based on the information, e.g., attributes, obtained for each app; the user's interests for instance based on a social profile; and provisioned traffic steering rules. For example traffic of media & video apps or music & audio apps is routed to WLAN or to the wireless access indicated by the traffic rule. Routing to WLAN can be unconditional or only when the WLAN meets certain access criteria in the policy, e.g. BSS load<60% or backhaul bandwidth>2 Mbps, etc. Apps developed by the home operator are routed to cellular to guarantee good quality of experience. Foreground traffic of apps that match the user profile is routed to cellular, while background traffic of apps that match the user profile is routed to WLAN. Traffic of apps that match the user profile, e.g. medical apps for a doctor, is routed to cellular if the data quota over cellular is not exceeded (routed to WLAN otherwise). Traffic of apps developed by the home operator is routed on cellular even when roaming. Apps paid for by the user are allowed to send background traffic, while free apps are restricted from sending background traffic. Media & video apps and/or music & audio apps are blocked over cellular when roaming.

Accordingly, a single traffic sterring rule can apply to a range of applications for less tedious policy provision in a network element and more efficient traffic steering in a mobile device. For example, a single traffic steering rule could apply to: all apps having a certain category type; all apps that match information in a user's social profile; all paid apps; all apps from the same developer, etc. This enables more intelligent routing decisions by the mobile device, such as: route traffic of apps from AT&T Services, Inc. to cellular; or route traffic of media & video apps to WLAN, only if WLAN backhaul bandwidth>X; or route traffic of apps that match the user's social profile to WLAN, only if WLAN channel utilization<Y; or route "paid" apps to Cellular, only if RSRP>−90 dBm, etc.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method performed by a mobile device for routing traffic of applications installed on the mobile device, the method comprising:

receiving, from a source external to the mobile device, a set of attributes for a first application installed on the mobile device, comprising querying an application store from which the first application was received to receive the set of attributes;

receiving, from a network element, a set of application traffic routing rules, wherein one application traffic routing rule of the set of application traffic routing rules comprises a network access among multiple network accesses of the mobile device for routing traffic of the first application if a user preference matches at least one attribute of the set of attributes;

accessing user information in a user's social profile from a social website, wherein the user information comprises personal characteristics of the user;

automatically determining the user preference from the user information in the user's social profile;

determining whether the at least one attribute of the set of attributes of the first application matches the user preference; and selecting, controlled by at least one application traffic routing rule of the received set of application traffic routing rules, the network access from the multiple network accesses, wherein the selecting is based on whether the at least one attribute matches the user preference.

2. The method of claim 1, wherein receiving the set of application traffic routing rules comprises receiving a first application traffic routing rule that defines how application traffic should be routed based on a first attribute of the set of attributes of the first application, and wherein the network access is selected under the control of the first application traffic routing rule.

3. The method of claim 1, wherein a category type of the first set of attributes of the first application is used in determining whether the at least one attribute matches the user preference.

4. The method of claim 3, wherein the category type is used, by an application store from which the first application was obtained, to categorize the first application among a plurality of applications.

5. The method of claim 1, wherein receiving the set of application traffic routing rules comprises receiving a set of application traffic routing rules that define how application traffic that matches with user preferences should be routed.

6. The method of claim 1, wherein receiving the set of attributes for the first application comprises querying a developer's server of the first application to receive the set of attributes.

7. The method of claim 1, wherein receiving the set of attributes for the first application comprises obtaining at least one of:
   a category type; or
   a developer name.

8. The method of claim 1, wherein receiving the set of attributes for the first application comprises obtaining at least one of:
   rating;
   cost; or
   version number.

9. The method of claim 1, wherein the set of application traffic routing rules is received from a 3GPP-compliant network element.

10. A mobile device configured for routing traffic of applications installed on the mobile device, the mobile device comprising:
   a communication interface; and
   a processor coupled to the communication interface and configured to:
      receive a set of attributes for a first application installed on the mobile device by querying an application store from which the first application was received to receive the set of attributes;
      receive, from a network element via the communication interface, a set of application traffic routing rules, one application traffic routing rule of the set of application traffic routing rules comprising a network access among multiple network accesses of the mobile device for routing traffic of the first application if a user preference matches a first attribute of the set of attributes;
      access user information in a user's social profile from a social website, wherein the user information comprises personal characteristics of the user;
      automatically determine the user preference from the user information in the user's social profile;
      determine that the first attribute of the set of attributes for the first application matches the user preference; and
      apply a first application traffic routing rule of the received set of application traffic routing rules to select, based on the first attribute matching to the user preference, the first network access from the multiple network accesses.

11. The mobile device of claim 10, wherein the processor is configured to connect to an Access Network Discovery and Selection Function server of a 3GPP-compliant network to receive the set of application traffic routing rules.

12. The mobile device of claim 10, wherein the first user attribute is a category type.

13. A method performed by a mobile device for routing traffic of applications installed on the mobile device, the method comprising:
   determining a set of attributes for a first application installed on the mobile device by querying an application store from which the first application was received to receive the set of attributes;
   receiving, from a network element, a first application traffic routing rule that defines how application traffic that correlates with user preferences should be routed, wherein the first application traffic routing rule comprises a network access among multiple network accesses of the mobile device for routing traffic of the first application if a user preference matches a first attribute of the set of attributes;
   accessing user information in a user's social profile from a social website, wherein the user information comprises personal characteristics of the user;
   automatically determining the user preference from the user information in the user's social profile;
   matching, to the user preference, the first attribute of the set of attributes for the first application; and
   applying the first application traffic routing rule, responsive to matching the first attribute to the user preference, to select the first network access from the multiple network accesses.

14. The method of claim 13, wherein matching the user preference to the first attribute of the first application comprises matching an application category preference to a category type of the first application.

15. The method of claim 14, further comprising determining the application category preference from information in a user social profile.

16. The method of claim 13, wherein the first application traffic routing rule is included in 3GPP-compliant intersystem routing policy received from the network element.

17. The method of claim 1, wherein the accessing of the user information in the user's social profile includes accessing user information through an installed application used to access the social website.

18. The mobile device of claim 10, wherein the processor is configured to access the user information in the user's social profile by accessing user information through an installed application used to access the social website.

19. The method of claim 13, wherein the accessing of the user information in the user's social profile includes accessing user information through an installed application used to access the social website.

* * * * *